United States Patent [19]

Yoshimura et al.

[11] Patent Number: 4,989,702

[45] Date of Patent: Feb. 5, 1991

[54] CONTROL SYSTEM FOR TORQUE CONVERTER OF AUTOMATIC TRANSMISSION

[75] Inventors: Hiroshi Yoshimura; Takuji Fujiwara; Kozo Ishii; Kazuo Takemoto, all of Hiroshima, Japan

[73] Assignee: Mazda Motor Corporation, Hiroshima, Japan

[21] Appl. No.: 428,763

[22] Filed: Oct. 30, 1989

[30] Foreign Application Priority Data

Oct. 31, 1988 [JP] Japan .................. 63-275894

[51] Int. Cl.⁵ .................. F16H 45/02; F16H 61/14
[52] U.S. Cl. .................. 192/3.29; 192/3.31; 74/890; 475/65
[58] Field of Search .................. 192/3.28, 3.29, 3.3, 192/3.31, 103 R, 103 F; 475/65; 74/890

[56] References Cited

U.S. PATENT DOCUMENTS

| | | | |
|---|---|---|---|
| 4,468,988 | 9/1984 | Hiramatsu | 192/103 R X |
| 4,531,433 | 7/1985 | Suga | 192/3.31 X |
| 4,580,671 | 4/1986 | Matsuoka et al. | 192/0.076 |
| 4,618,036 | 10/1986 | Ideta | 192/3.3 |
| 4,618,041 | 10/1986 | Sotoyama et al. | 192/0.044 |
| 4,650,047 | 3/1987 | Nishikawa et al. | 192/3.31 |
| 4,660,693 | 4/1987 | Taga et al. | 192/3.3 X |
| 4,664,235 | 5/1987 | Yokoyama et al. | 192/3.29 |
| 4,669,441 | 6/1987 | Okimoto | 123/559 |
| 4,687,083 | 8/1987 | Sotoyama et al. | 192/0.076 |
| 4,720,003 | 1/1988 | Murasugi | 192/3.3 X |

FOREIGN PATENT DOCUMENTS 57-33253 2/1982 Japan .
62-297567 12/1987 Japan .

Primary Examiner—Richard Lorence
Attorney, Agent, or Firm—Fleit, Jacobson, Cohn, Price, Holman & Stern

[57] ABSTRACT

A control system for a torque converter includes a lock-up clutch provided in a torque converter for connecting an input member and an output member of the torque converter directly. An engaging and disengaging hydraulic device controls an engaging and disengaging action of the lock-up clutch. A shift valve provided with a first and second spools in series controls introduction of a driving hydraulic pressure into the hydraulic device. The first spool of the shift valve is subjected to a first hydraulic pressure at one end, while the second spool is subjected to a second hydraulic pressure at the other end. The first and second spools are subjected to a third hydraulic pressure therebetween. The control system further includes a first control device for controlling the first hydraulic pressure, a second control device for controlling the second hydraulic pressure, an adjusting valve for adjusting the driving hydraulic pressure introduced into the engaging or disengaging hydraulic device, and a third control device for controlling a hydraulic pressure for controlling the adjusting valve. Converter, lock-up and slip conditions of the torque converter can be selectively established by switching shift positions of the single shift valve.

11 Claims, 5 Drawing Sheets

CONTROL SYSTEM FOR TORQUE CONVERTER OF AUTOMATIC TRANSMISSION

CROSS-REFERENCE TO THE RELATED APPLICATION

This application relates to U.S. Patent application Ser. No. 242,282 filed on Sept. 8, 1988 entitled "TORQUE CONVERTER SLIP CONTROL DEVICE", U.S. Ser. No. 250,603 filed on Sept. 29, 1988 by Fumiaki Baba et al entitled "LOCK-UP CONTROL SYSTEM FOR AUTOMATIC TRANSMISSION", U.S. Ser. No. 293,689 filed on Jan. 5, 1989 entitled "SLIP CONTROL SYSTEM FOR LOCK-UP CLUTCH OF AUTOMATIC TRANSMISSION", and U.S. Ser. No. 310,333 filed on Feb. 14, 1989 entitled "SLIP CONTROL SYSTEM FOR TORQUE CONVERTER OF AUTOMATIC TRANSMISSION", which are assigned to the same assignee as the present invention.

BACKGROUND OF THE INVENTION

FIELD OF THE INVENTION

The present invention relates to a torque converter for an automatic transmission having a lock-up clutch, and more specifically to a slip control valve system for the lock-up clutch.

DESCRIPTION OF THE PRIOR ART

In torque converter incorporated in automatic transmissions of automotive vehicles, it has been proposed to have a lock-up clutch mechanism for providing a direct connection between an engine output member and an input member of the transmission under a predetermined vehicle operating condition wherein amplification of torque, or a change in torque from the engine, does not occur so that a fuel consumption performance of the vehicle is improved. When the lock-up clutch mechanism is engaged, the torque from the engine is transmitted so as to bypass the torque converter and be transmitted to the transmission through the lock-up clutch mechanism. This operation is advantageous in that the fuel consumption performance can be improved, because there is no energy loss caused by fluid friction in the torque converter. On the other hand, it is disadvantageous because the torque amplification and shock absorbing function of the torque converter is absent and therefore riding comfort deteriorates.

In view of the above characteristics of the lock-up mechanism of the torque converter, Japanese Patent Public Disclosure (KOKAI) No. 62-297567, laid open to the public on Dec. 24, 1987, discloses a slip control system for a transmission of motor vehicle having a torque converter and lock-up clutch mechanism wherein the lock-up clutch mechanism is constituted by a converter cover connected with an engine output shaft and a damper piston connected with a turbine shaft with the damper piston being brought into frictional engagement with the converter cover in accordance with a hydraulic pressure introduced into hydraulic chambers formed at front and back sides of the damper piston. The transmission is adapted to carry out a slip control in which the lock-up clutch allows a certain slippage so as to take selectively a lock-up condition, wherein engine torque is transmitted through only the torque is transmitted through only the torque converter and a slip condition, wherein the engine torque is transmitted through both the lock-up clutch and the torque converter.

Japanese Patent Public Disclosure No. 57-33253 (corresponding to U.S. Pat. No. 4,468,988, issued on Sept. 4, 1984) laid open to the public in 1982, discloses a slip control system for establishing a proper slip condition wherein respective rotation speeds of an input and output members of the torque converter are detected and a hydraulic pressure for controlling the lock-up clutch is controlled for causing a rotation speed difference between the input and output members to approach a predetermined value by means of a feedback control. U.S. Pat. Nos. 4,580,671, 4,618,041, 4,669,441, 4,687,083, and 4,468,988 also disclose conventional transmission control systems.

It should, however, be noted that in conventional transmissions, a complicated hydraulic control mechanism including a pressure regulator, a control valve, gate valves, air bleed valves, check valves and the like than been needed for carrying out slip control, providing the three different conditions of the torque converter described above.

SUMMARY OF THE INVENTION

It is therefore an object of the present invention to provide a slip control system for an automatic transmission which is simple in structure.

It is another object of the present invention to provide a hydraulic control system for an automatic transmission which can selectively take a lock-up condition, a converter condition and a slip condition in accordance with a vehicle operating condition.

It is still another object of the present invention to provide a control system for an automatic transmission which can ease torque shock.

It is further object of the invention to provide a control valve structure which provides a simplified hydraulic control mechanism for an automatic transmission adapted to carry out slip control of a lock-up clutch mechanism.

The above and other objects of the present invention can be accomplished by a control system for a torque converter of an automatic transmission comprising a lock-up clutch device provided in a torque converter for connecting input and output members of the torque converter directly, an engaging and disengaging hydraulic device for controlling an engaging and disengaging action of the lock-up clutch device, and a shift valve device provided with first and second spools in series for controlling an introduction of a driving hydraulic pressure into the hydraulic device. The spool is subjected to a first hydraulic pressure at a first end thereof, and the second spool is subjected to a second hydraulic pressure at a second end thereof opposite to the first end of the first spool. The first and second spools are subjected to a third hydraulic pressure therebetween. A first control device is provided for controlling the first hydraulic pressure, and a second control device is provided for controlling the second hydraulic pressure. An adjusting valve controls the driving hydraulic pressure introduced into the engaging or disengaging hydraulic device, while a third control device controls a hydraulic pressure for controlling the adjusting valve.

According to the above control system, the first and second spools are moved in the same direction when the first control device changes the first hydraulic pressure from high to low or low to high. Where the second hydraulic pressure is changed by the second control device and the first hydraulic pressure is maintained at a low value, the first spool stays at its position and only the second spool is moved by virtue of the third hydraulic pressure. As a result, the shift valve can take selectively a first position wherein both the first and second spool are positioned at one side in a bore of the shift valve, a second position wherein the first and second spools are positioned at the other side in the bore, and a third position wherein the first spool is positioned at the one side and the second spool is positioned at the other side in the bore.

The shift valve selectively takes one of the three different spool positions in accordance with a vehicle operating condition to switch a hydraulic pressure introducing path for the lock-up clutch mechanism so that the lock-up mechanism establishes a lock-up condition when a hydraulic pressure is introduced only into the engaging hydraulic device, a converter condition when a hydraulic pressure is introduced only to the disengaging hydraulic device and a slip condition when a hydraulic pressure is introduced into both the engaging and disengaging hydraulic devices.

The third control device controls a controlling hydraulic pressure for the adjusting valve so that the adjusting valve adjusts the hydraulic pressure for the disengaging device based on the controlling hydraulic pressure.

This control of the hydraulic pressure for the disengaging device enables a pressure difference between the engaging and disengaging device to be changed during the slip condition so that slippage in the lock-up clutch mechanism during the slip condition can be controlled with or without steps.

In addition, the third control device may be controlled by means of a feedback control in which a speed difference between engine and turbine speed is detected for better slip control.

The above and other features of the present invention will be apparent from the following description while taking reference to the accompanying drawings.

DESCRIPTION OF THE PREFERRED EMBODIMENT

Referring to the drawings, a preferred embodiment of the present invention will be described hereinafter.

STRUCTURE OF TRANSMISSION

Figure 1:
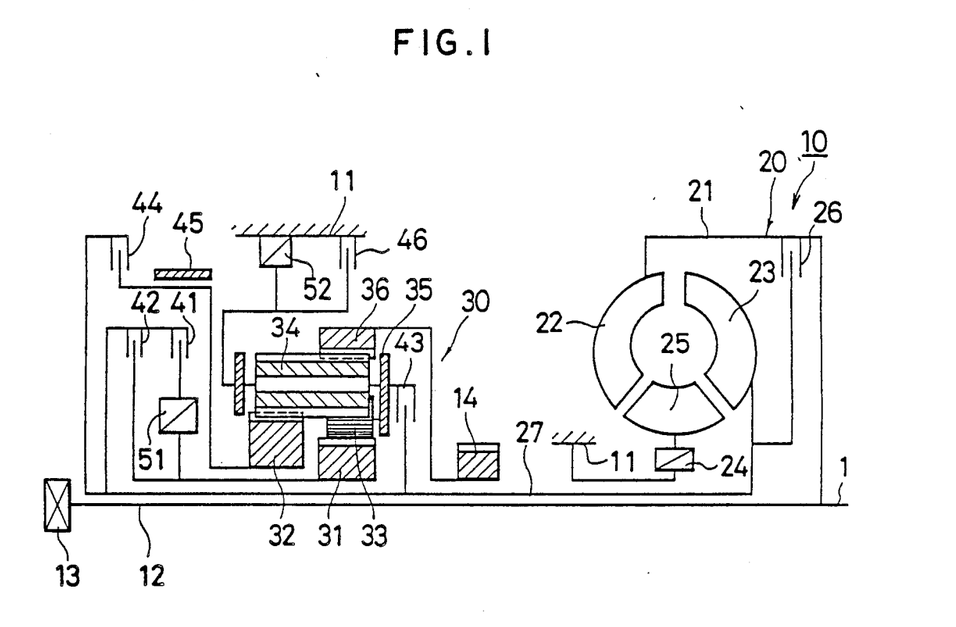
FIG. 1 is a schematic view of an automatic transmission to which a control system in accordance with the present invention can be applied.

Referring specifically to FIG. 1, there is shown a schematic view of an automatic transmission 10. The transmission 10 is provided with a torque converter 20 and a multiple stage transmission gear mechanism 30. The gear mechanism 30 is provided with a plurality of frictional element such as a clutch, a brake and the like. The elements are used to switch a power transmitting path to selectively establish a desirable gear stage selected from among a first through fourth gear stages in a range D, the first through third gear stages in a range 2, the first and the second gear stages in a range 1, and a range R.

The torque converter 20 is provided with a pump 22 on one side of a case 21 fixed to an engine output shaft 1 for rotating together with the shaft 1, a turbine 23 facing the pump 22 and rotatably mounted on the other side of the case 21 for being driven by the pump 22 through a hydraulic oil, and a stator 25 disposed between the pump 22 and the turbine 23 for amplifying the torque when a speed ratio of the turbine 23 to the pump 22 is smaller than a predetermined value. The torque converter 20 is also provided with a lock-up clutch 26 for directly connecting the engine output shaft 1 or an input member of the torque converter 20 and a turbine 23 or an output member of the torque converter 20.

The gear mechanism 30 is constituted by Ravigneaux-type planetary gear mechanism. The gear mechanism 30 is provided with a small sun gear 31 slidably mounted on the turbine shaft 27 and a large sun gear 32 slidably mounted on the turbine shaft 27 at a rear position of the small sun gear 31, a plurality of short pinion gears 33 meshed with the small sun gear 31, a long pinion gear 34 meshed with the short pinion gears 33 at a front portion and with the large sun gear 32 at a rear portion thereof, a carrier 35 rotatably carrying the long pinion gear 34 and the short pinion gears 33, and a ring gear 36 meshed with a front portion of the long pinion gear 34.

There are provided a forward clutch 41 and a first one-way clutch 51 in series between the turbine shaft 27 and the small sun gear 31. There is provided a coast clutch 42 in parallel with the clutches 41 and 51. A reverse clutch 44 is disposed between the turbine shaft 27 and the large sun gear 32. A 2-4 brake 45 formed as a band brake is provided between the large sun gear 32 and the reverse clutch 44 for fixing the large sun gear 32. A 3-4 clutch 43 is disposed between the turbine shaft 27 and the carrier 35. Between the carrier 35 and a transmission case 11 are provided a second one-way clutch 52 and a low & reverse brake 46 for fixing the carrier 35 in parallel with each other.

The ring gear 36 is connected with an output gear 14 so that a rotative power is transmitted from the output gear 14 to an output.

Hereinafter, there is described operations of frictional elements or brakes and clutches 41–46 and one-way clutches 51 and 52 in relation to the gear stages.

In the first stage, the forward clutch 41 is engaged and the first and second one-way clutches 51 and 52 are locked. As a result, the output torque of the torque converter 20 is introduced from the turbine shaft 27 to the small sun gear 31 of the planetary gear mechanism through the forward clutch 41 and the one-way clutch 51. In this case, the carrier 35 is locked by virtue of the second one-way clutch 52 so that no differential operation occurs in the planetary gear mechanism when the power is transmitted from the small sun gear 31 to the ring gear 36 through the short pinion gear 33 and the long pinion gear 34. Thus, a first gear stage having a large reduction speed ratio corresponding to a gear ratio of the small sun gear 31 to the ring gear 36 can be obtained.

In the second stage, the forward clutch 41 is engaged to lock the one-way clutch 51 and the 2-4 brake 45 is engaged to fix the large sun gear 32 and to race the second one-way clutch 52. As a result, the power transmitted from the turbine shaft 27 to the small sun gear 31 is transmitted to the long pinion gear 34 through the short sun gear 33 to rotate the long pinion gear 34 around the large sun gear 32 which is fixed in this situation. Thus, the carrier 35 is rotated. As a result, the rotation speed of the ring gear 36 is increased compared with the first stage due to the rotation of the carrier 35 (rotation of the long pinion gear around the large sun gear 32) so that a second stage having a smaller reduction speed ratio than the first stage can be established.

In the third stage, the 2-4 brake 45 is disengaged and the 3-4 clutch 43 is engaged in the above mentioned condition of the second stage. The rotative power of the turbine shaft 27 is transmitted to the small sun gear 31 through the forward clutch 41 and the first one-way clutch 51 and concurrently to the carrier 35 through the 3-4 clutch 43. As a result, the planetary gear mechanism is integrally rotated as if it were a one piece part so that in the third stage the ring gear 36 is rotated with the same speed as the turbine shaft 27.

In the fourth stage, the 2-4 brake 45, which is disengaged in the third stage, is engaged again. As a result, the rotation of the turbine shaft 27 is transmitted to the carrier 35 from the 3-4 clutch 43 to rotate the long pinion gear 34 around the large sun gear 32. However, the large sun gear 32 is fixed by the 2-4 brake 45 so that the long pinion gear 34 is rotated around the large sun gear 32 and concurrently rotated by itself. This causes the rotation of the ring gear 36 meshed with the long pinion gear 34 to be increased by the self-rotation of the long pinion gear 34 in addition to the rotation of the carrier 35 (rotation of the turbine shaft) so that the fourth stage of, i.e., an over drive condition can be established. In this case, although the forward clutch 41 is maintained in the engaged condition, the one-way clutch 51 connected with the forward clutch 41 in series races. In addition, the coast clutch 42 is not engaged. Therefore, the rotation of the turbine shaft 27 is never transmitted to the small sun gear 31 in this stage.

In the reverse stage, the reverse clutch 44 and the low & reverse brake 46 are engaged so that the rotation of the turbine shaft 27 is introduced to the large sun gear 32 and the carrier 35 is fixed. Consequently, the rotation is transmitted through an integrated gear train or through the large sun gear 32 and the long pinion gear 34 to the ring gear 36 so that a speed reduction ratio corresponding to a gear ratio of the ring gear 36 to the large sun gear 32 can be obtained. In this case, the ring gear 36 is rotated in a direction opposite to those of the turbine shaft 27 and the large sun gear 32. Thus, the reverse condition can be established. The one-way clutch 51, which transmits the rotation in the first through the third stages, and the second one-way clutch 52, which bears a counter force in the first stage, race under a coasting condition of the vehicle. However, the coast clutch 42, in parallel with the one-way clutch 51, is engaged in the third stage of the range D, the second and third stages of the range 2, and the first and second stages of the range 1, and the low & reverse brake 46 in parallel with the second one-way clutch 52 is engaged in the first stage of the range 1 so that an engine brake effect can be obtained in those conditions.

The table 1 shows a relationship between the respective gear stages and operations of the frictional elements 41–46 and the one-way clutches 51 and 52 of the transmission.

TABLE 1

| Range | | Clutch | | | | Brake | | One-way Clutch | |
|---|---|---|---|---|---|---|---|---|---|
| | | Forward (41) | Coast (42) | 3-4 (43) | Reverse (44) | 2-4 (45) | Low Reverse (46) | First (51) | Second (52) |
| P | | | | | | | | | |
| R | | | | | O | | O | | |
| N | | | | | | | | | |
| D | 1 | O | | | | | | O* | O* |
| | 2 | O | | | | O | | O* | |
| | 3 | O | | O | O | | | O* | |
| | 4 | O | | | O | O | | | |
| 2 | 1 | O | | | | | | O* | O* |
| | 2 | O | O | | | O | | O* | |
| | 3 | O | O | O | | | | O* | |
| 1 | 1 | O | O | | | | O | O* | O* |
| | 2 | O | O | | | O | | O* | |

In the table 1, reference * means that the corresponding element is raced under a coasting condition.

STRUCTURE OF HYDRAULIC CONTROL CIRCUIT

Figure 2:
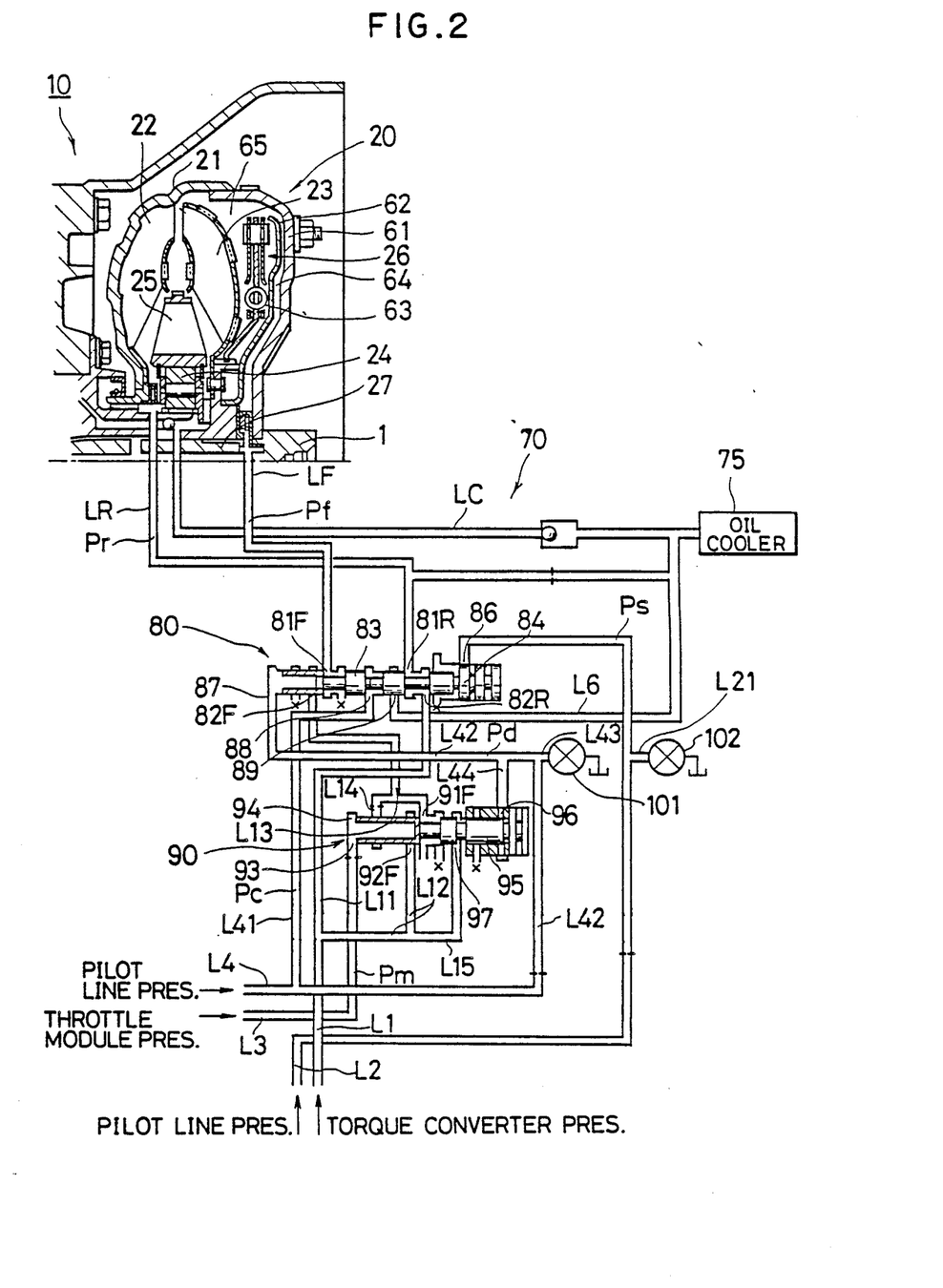
FIG. 2 is a hydraulic control circuit incorporated into the automatic transmission of FIG. 1 for controlling a lock-up mechanism.

FIG. 2 shows a hydraulic control circuit 70 for controlling the lock-up clutch 26. The hydraulic circuit 70 is incorporated into an entire hydraulic control unit for controlling the whole automatic transmission as a part of it. Hydraulic control circuits for controlling a hydraulic pressure introduced into actuators of the respective frictional elements 41–46 are omitted from the illustration.

The torque converter 20 is provided with the lock-up clutch 26 between the turbine 23 and the converter cover 61. The lock-up clutch 26 is constituted by a torsion damper 63 rotating integrally with the turbine shaft 27, a damper piston 62, and a friction plate (not shown) facing a peripheral portion of the damper piston 62. The damper piston 62 divides an inner space of the converter cover 61 into a R-chamber 65 adjacent to the turbine 23 and a F-chamber 64 adjacent to the converter cover 61. The damper piston 62 is brought into a frictional engagement with the frictional plate by an engaging force in accordance with a pressure difference between the R-chamber 65 and the F-chamber 64.

The lock-up clutch 26 selectively takes, according to the frictional engaging condition, a lock-up condition or engaged clutch condition wherein the rotation of the engine output shaft 1 is directly transmitted to the turbine shaft 27, a converter condition or disengaged clutch condition wherein the rotation of the engine output shaft 1 is transmitted to the turbine shaft 27 through the converter cover 61 and the turbine 23, and a slip condition wherein the converter cover 61 is brought into slidable engagement with the damper piston 62 so that the rotation of the engine output shaft 1 is transmitted through the pump 22 and the turbine 23 and partially through the lock-up clutch 26 to the turbine shaft 27. The hydraulic circuit 70 is provided with a lock-up shift valve 80 which selectively takes three positions corresponding to the above three conditions of the lock-up clutch 26, a lock-up control valve 90 for introducing a hydraulic pressure into the F-chamber 64 through the shift valve 80, a duty solenoid valve 101 for controlling a second pilot pressure of the shift valve 80 and the control valve 90 by means of a duty control, and a lock-up solenoid valve 102 for controlling a first pilot pressure of the shift valve 80 by means of an ON-OFF control. The three positions of the shift valve 80 mean a first position wherein the hydraulic pressure is introduced only into the R-chamber 65, a second position wherein the hydraulic pressure is introduced only into the F-chamber 64, and a third position wherein the hydraulic pressure is introduced into both the R-chamber 65 and the F-chamber 64.

The hydraulic circuit 70 is provided with various hydraulic passages such as, a torque converter line L1 in which a hydraulic pressure from the pump 22 is adjusted to a predetermined line pressure by virtue of a regulator valve (not shown), a first pilot line L2 for introducing the first pilot pressure into the shift valve 80, a throttle modulator line L3 into which a throttle modulator pressure adjusted to a value corresponding to a throttle opening of the engine through a throttle modulator valve and a duty solenoid valve (not shown) is introduced, and a second pilot line L4 into which a predetermined second pilot pressure is introduced after being reduced by virtue of a solenoid reducing valve (not shown).

The torque converter line L1 is divided into a line L11 connected to a port 82R of the shift valve 80 and a line L12 connected to a port 92F of the control valve 90. According to the illustration of FIG. 2, spools 83 and 84 of the shift valve 80 are positioned at a rightmost position, or the first position. In this position, a port 81R is connected to the port 82R so that the line L11 introduces a hydraulic pressure of the torque converter into a line LR through the ports 81R and 82R. The hydraulic pressure from the line L12 is slightly reduced by the control valve 90 and introduced into a port 82F of the shift valve 80 through a port 91F and line L13 and concurrently introduced into a port 97 of the control valve 90 through a line L15. In the first position, a port 82F of the shift valve 80 is closed so that the torque converter pressure is not introduced into a line LF from the line L13.

The line LR is connected with the R-chamber 65 through the pump 22 of the torque converter 20. The line LF is connected with the F-chamber 64. The hydraulic pressures in the R-chamber 65 and the F-chamber 64 are determined by the hydraulic pressures from the lines LR and LF. Since the lock-up clutch 26 is operated by an engaging force corresponding to a pressure difference between the R-chamber 65 and the F-chamber 64, the lock-up engaging force is determined by a pressure difference between a line pressure Pr of the line LR and a line pressure Pf of the line LF.

For instance, in the first position as illustrated in FIG. 2, the shift valve 80 provides only the line LR with the torque converter pressure so that the pressure difference between the R-chamber 65 and the F-chamber 64 is maximized. As a result, the lock-up condition or the engaged condition of the lock-up clutch 26 can be established.

The first pilot line L2 is connected with a port 86 of the shift valve 80 through an orifice and with the solenoid valve 102 through a line L21. The solenoid valve 102 allows the first pilot line L2 to be drained in the ON-condition thereof so that the pilot pressure acting on a right end surface of the spool 84 as illustrated is reduced.

The throttle modulator line L3 is connected with a port 93 of the control valve 90 to introduce the throttle modulator pressure into the port 93 as a pilot pressure for the control valve 90. The throttle modulator pressure is adjusted by virtue of the throttle modulator valve and the duty solenoid valve (not shown) in a manner that the throttle modulator pressure is increased as the throttle opening is increased.

The second pilot line L4 is divided into a line L41 and a line L42. The line L41 is connected with a port 88 formed on a central portion of the shift valve 80 to introduce a predetermined hydraulic pressure such as 4 kg/cm$^2$ as a pilot pressure between the spools 83 and 84. The line L42 is connected with a port 87 of the shift valve 80 through an orifice, with a port 96 of the control valve 90 through a line L44 and with the duty solenoid valve 101 through a line L43. The duty solenoid valve 101 allows the second pilot line L4 to be drained when the duty solenoid valve is in an ON-condition to thereby reduce a pilot pressure on a left end surface of the spool 83 of the shift valve 80 and a pilot pressure on a right end surface of a spool 95 of the control valve 90 as illustrated by leaking hydraulic fluid. The duty solenoid valve 101 is subjected to an ON-OFF control in a certain cycle (duty ratio control). In other words, the pilot pressure of the line L42 is controlled by a duty ratio (a ratio of a valve open time period to a total period of a cycle) in of the duty control applied to the duty solenoid valve 101.

A line L6 is connected with a port 89 of the shift valve 80 to connect the port 89 to an oil cooler 75. A line LC in which a check valve is provided connects the F-chamber 64 of the torque converter 20 with the oil cooler 75.

STRUCTURE AND OPERATION OF SHIFT VALVE AND CONTROL VALVE

Hereinafter, the structures and operations of the shift valve 80 and the control valve 90 will be described, with reference with FIGS. 3A and 3B.

As illustrated, the shift valve 80 is provided with the spool 83 arranged within a sleeve thereof and urged by a spring 85 towards the right, and the spool 84 arranged rightward of the spool 83 in the sleeve and movable relative to the spool 83. There is disposed a spring 85a between the spools 83 and 84 as a retainer for providing smooth movement of the spools 83 and 84. As aforementioned, the left end surface of the spool 83 is subjected to a pilot pressure Pd from the line L42 and the right end surface 84a of the spool 84 is subjected to a pilot pressure Ps from the line L2. The spool 84 is provided with an enlarged portion at the right end thereof so that the right end surface 84a is subjected a larger pressure than the left end surface of the spool 83 because of the larger area than that of the left end surface of the spool 83.

The control valve 90 is provided with the spool 95 arranged within a sleeve thereof and urged by a spring 99 rightward as illustrated. The spool 95 is subjected to the throttle modulator pressure (hereinafter referred to as Pm) from the line L3 through a port 93 at a left end surface thereof and subjected to the line pressure of the line L13 at a stepped portion 95c formed on a left land portion thereof through the line L14 in which an orifice is provided and a port 94. The spool 95 is subjected to a duty pressure Pd of a line L44 at a right end surface 95a thereof and is also subjected to a line pressure of the line L12 or the torque converter pressure at a stepped portion 95b formed on a right land portion thereof through the line L15 and the port 97.

In operation, in the converter condition of the lock-up clutch 26, the duty ratio of the solenoid valve 101 is controlled to 0% so that the duty pressure PdO of the second pilot line L4 after being slightly reduce by the orifice is introduced into the left end surface of the spool 83 through the port 87. In this case, the solenoid valve 102 is in an OFF condition so that the pilot pressure Ps of the first pilot line L2 is introduced into the end surface 84a of the spool 84 through the port 86. As aforementioned, the pilot pressure Pc of the line L41 is normally introduced between the spools 83 and 84 through the port 88.

Figure 3A:
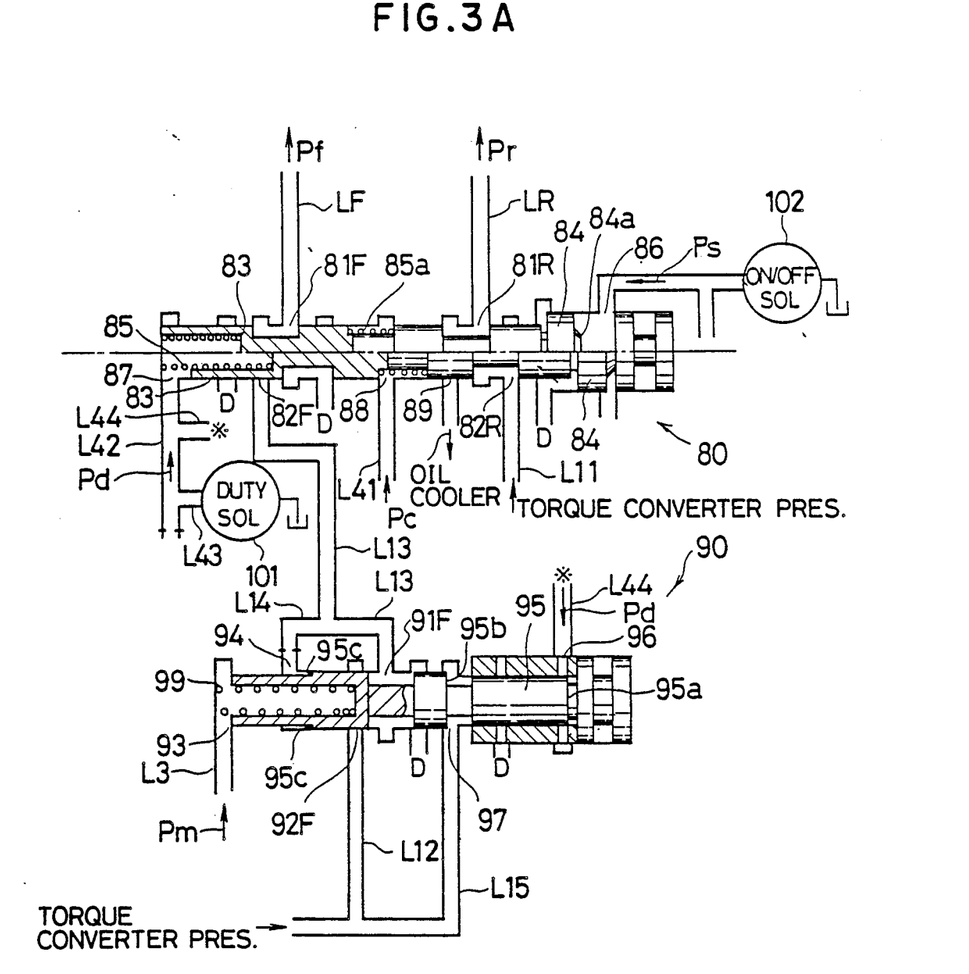
FIG. 3A a sectional view showing a shift valve and control valve employed in the hydraulic control circuit of FIG. 2.
Figure 3B:
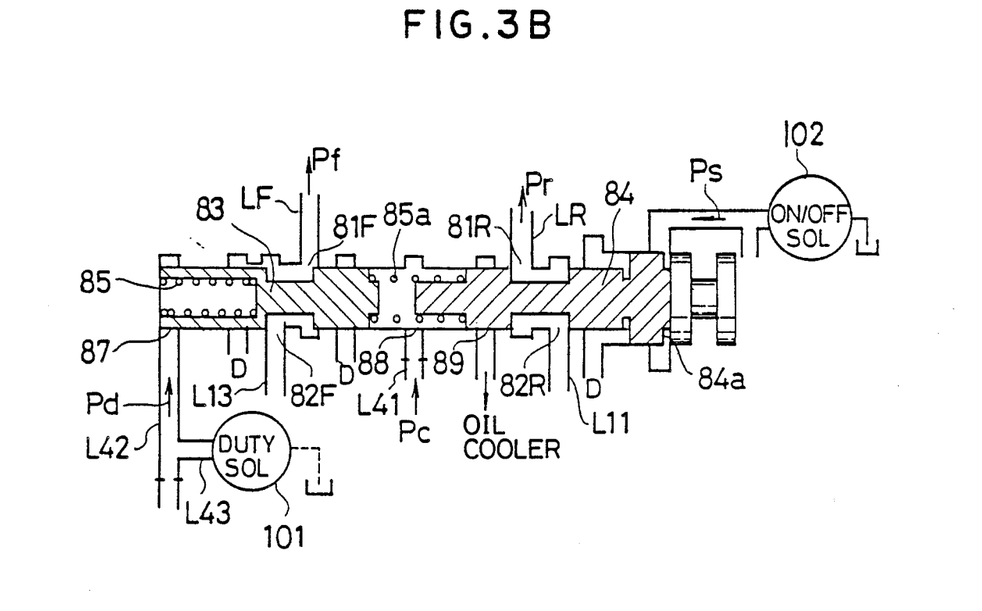
FIG. 3B is a sectional view showing the shift valve shown in FIG. 3A bit in a different position.

Since the end surface 84a of the spool 84 is relatively large in pressure area so that the leftward force on the spool 84 is greater than the rightward force on the spool 83 due to the resilient force of the spring 85 and the duty pressure PdO, both the spools 83 and 84 stay at their leftmost positions as shown by the upper half portion over the horizontal center line of the spools illustrated in FIG. 3A.

In this position, in which both the spools 83 and 84 are positioned at their leftmost positions the port 82F and port 81R are connected with the port 81F and 89 respectively so that the torque converter pressure of the line L1, after being slightly reduced by the control valve 90, is introduced into the line LF and the line LF is brought into connection with the oil cooler 75 through the port 89. The shift valve 80 thus takes a second position such that the torque converter pressure is introduced into the F-chamber 64 through the line LF, and drained through the R-chamber 65, the line LR and the line LC to the oil cooler 75. Thus, the lock-up clutch 26 is disengaged to establish the converter condition.

On the other hand, in the lock-up condition of the lock-up clutch 26, the solenoid valve 102 is turned on as the duty ratio of the solenoid 101 is maintained at a value of 0% so that the pilot pressure Ps of the line L2 is reduced. The resilient force of the spring 85 acting on the spool 83 overcomes the force acting on the end surface 84a of the spool 84 due to the pilot pressure so that the spool 83 is moved rightward together with the spool 84 in the illustration. As a result, the port 82R of shift valve 80 is brought into a connection with the port 81 R and the port 81F is brought into connection with a drain line D. In other words, a first position of the shift valve 80 is established, which is shown by the lower half portion below the horizontal center line of the spools 83 and 84 illustrated in FIG. 2. In this condition, the torque converter pressure is introduced into the R-chamber 65 through the line LR and the pump 22, while the line LF is drained to release the hydraulic pressure in the F-chamber 64. The damper piston 62 is brought into frictional engagement with the frictional plate due to the pressure difference between the R-chamber 65 and the F-chamber 64 to establish the lock-up condition of the lock-up clutch 26.

The duty ratio of the duty solenoid valve 101 is controlled beyond a predetermined value, for example, 20% as the solenoid valve 102 is maintained in the ON condition thereof so that the duty pressure Pd on the left end surface of the spool 83 is reduced. As a result, the spool 83 is moved in a leftward direction, due to the pilot pressure Pc normally acting between the spools 83 and 84, while the spool 84 stays at its rightmost position. In this case, the spool 83 is retained at a place where a rightward force due to the resilient force of the spring 85 and the duty pressure Pd is balanced with the leftward force due to the pilot pressure Pc. In other words, the shift valve 80 takes the third position as shown in FIG. 3B. The spool 83 opens the port 82F to connect the line L13 with the line LF so that: the torque converter pressure is introduced into the R-chamber 65 through the line LR and the pump 22 and the line pressure of the line L13 is introduced into the F-chamber 64 through the line LF. Consequently, the damper piston 62 is brought into the slidable frictional engagement with the frictional plate adjacent to the converter cover 61 in accordance with the pressure difference between the R-chamber 65 and the F-chamber 64 to establish the slip condition.

In the slip condition, the control valve 90 controls the torque converter pressure in accordance with the duty ratio of the duty solenoid valve 101 and the throttle modulator pressure Pm of the throttle modulator line L3.

In detail, the spool 95 is subjected to the duty pressure Pd through the line L44 at the right end surface 95a of the right land portion and to the torque converter pressure in the line L15 at a stepped portion 95b formed on a middle portion of the land portion as a pilot pressure. Since the duty pressure Pd and the throttle modulator Pm are introduced to the spool 95 in opposite directions to each other, the spool 95 is moved rightward to reduce the torque converter pressure when the duty ratio is increased or the duty pressure is reduced, or when the throttle opening is increased or the throttle module pressure Pm is increased. On the other hand, the spool 95 is moved leftward in the case of an increase of the duty pressure Pd or a decrease of the throttle modulator pressure Pm. Thus, the line pressure of the line L13 is adjusted in accordance with a hydraulic pressure balance between the duty pressure Pd and the throttle modulator pressure Pm.

The spool 95 is subjected to a rightward force due to the resilient force of the spring 99 and throttle modulator pressure Pm. The left land portion of spool 95 is subjected to a line pressure of the line L14 separated from the line L13 through an orifice at a stepped portion 95c formed on a middle portion of the left land portion. This suppresses a fluctuation of the torque converter pressure Pr on the R-chamber 65 and the line pressure Pf on the F-chamber 64.

ROLE OF THE CONTROL VALVE

Figure 4:
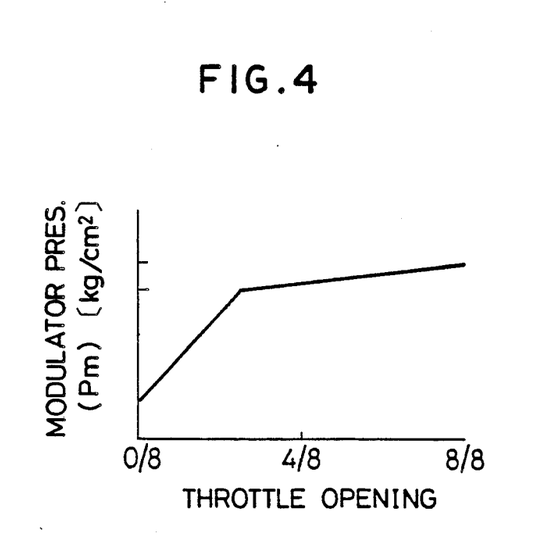
FIG. 4 shows a relationship between the throttle opening and the throttle modulator pressure.
Figure 5:
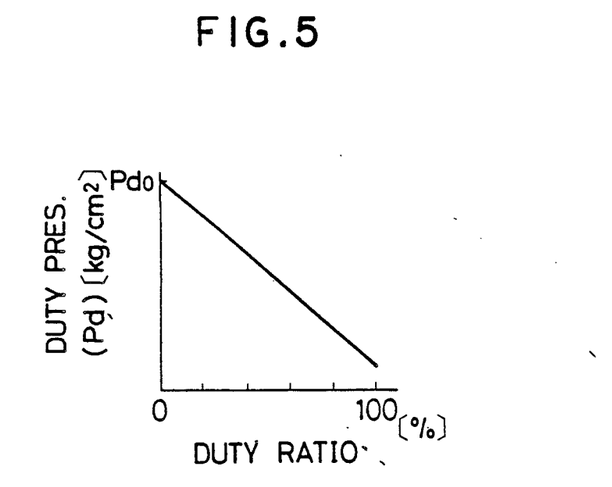
FIG. 5 shows a relationship between a duty ratio of a solenoid valve and a duty pressure.
Figure 6:
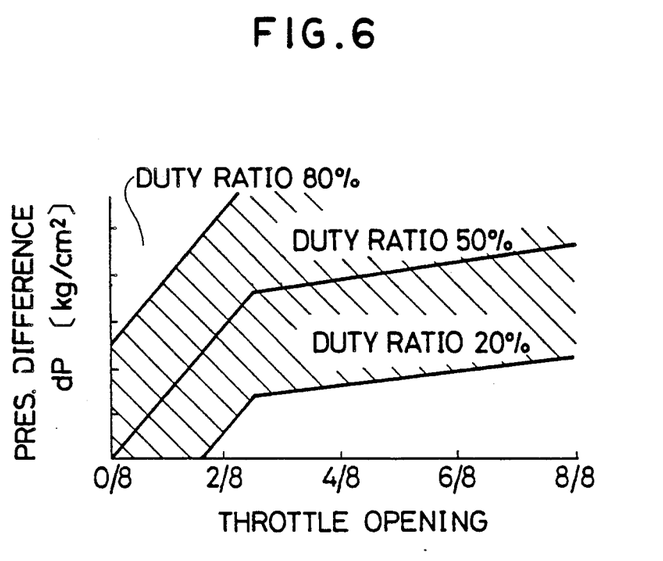
FIG. 6 shows a relationship of a throttle opening, a duty ratio, a pressure difference between line pressures to respective chambers of a torque converter.

FIG. 4 shows a relationship between the throttle opening and the throttle modulator pressure Pm. FIG. 5 shows a relationship between the duty ratio of the duty solenoid valve and the duty pressure Pd, and FIG. 6 shows a relationship of the throttle opening, the duty ratio, and the pressure difference between the line pressures Pr and Pf.

As shown in FIG. 4, the throttle modulator pressure Pm is increased as the throttle opening is increased. On the other hand, the duty pressure Pd is reduced due to the increase of the duty ratio. The control valve 90 is controlled based on the duty pressure Pd and the throttle modulator pressure Pm for an improved and responsive control of the pressure of R and F-chambers 65 and 64.

The line pressure Pf which determines fluid pressure in the F-chamber 64 is controlled based on the control valve 90 when the shift valve 80 is set at the third position for establishing the slip condition of the lock-up clutch 26. At this moment, the torque converter pressure in the line L11 is introduced to the line LR to provide the line pressure Pr which determines the pressure in the R-chamber 65 so that the pressure difference dP between the line pressures Pr and Pf can be controlled by the control valve 90 based on the pressure difference between the duty pressure Pd and the throttle modulator pressure Pm. Meanwhile, the duty solenoid valve 101, which controls the duty pressure Pd, is controlled by means of a feedback control so as to reduce a speed difference between the engine and the turbine 23 to within a certain level. The throttle modulator pressure Pm is increased as the throttle opening is increased. Thus, the spool 95 is moved due to the increased throttle opening to reduce the line pressure Pf. The pressure in the F-chamber 64 is therefore reduced to displace the lock-up clutch 26 toward the position it occupies in the disengaged condition. In this control, the duty pressure Pd and the throttle modulator pressure Pm are controlled independently from each other so that the pressure difference Pd can be widely controlled. The control valve 90 is controlled based on not only the speed difference for the feedback control but also the throttle opening. This makes the slip control responsive to the throttle opening.

The control valve 90 is placed in the line L15 and the line L14 so that a pressure fluctuation can be reduced during the slip control of the lock-up clutch 26.

According to the present invention, the three different conditions of the lock-up clutch 26 can be readily established by switching the positions of the single shift valve 80. In the slip condition, the engaging force of the lock-up clutch can be smoothly controlled through a control for the control valve 90.

In the above embodiment of the present invention, the duty solenoid valve 101 is commonly provided for controlling both the shift valve 80 and the control valve 90. It should however be noted that solenoid valves can be provided for the valves 80 and 90 independently.

It will be apparent from that many modifications and 15 variations may be made based on the above descriptions by those skilled in the art without departing from the scope of the following claims.

We claim:

1. A control system for a torque converter of an automatic transmission comprising:
    lock-up clutch means provided in said torque converter for connecting input and output members of the torque converter directly,
    engaging and disengaging hydraulic means for controlling an engaging and disengaging action, respectively, of the lock-up clutch means,
    shift valve means provided with first and second spools in series for controlling an introduction of a driving hydraulic pressure for said engaging and disengaging hydraulic means,
    said first spool being subjected to a first hydraulic pressure at a first end thereof,
    said second spool being subjected to a second hydraulic pressure at a second end thereof opposite to said first end of the first spool,
    said first and second spools being subjected to a third hydraulic pressure therebetween,
    first control means for controlling said first hydraulic pressure,
    second control means for controlling said second hydraulic pressure,
    adjusting valve means for controlling said driving hydraulic pressure for said engaging or disengaging hydraulic means,
    third control means for adjusting a control pressure for controlling said adjusting valve means,
    said shift valve means taking, selectively, a first position wherein both the first and second spools are positioned at a first end portion of the shift valve means, a second position wherein the first and second spools are positioned at a second end portion of the shift valve means opposite to the first end portion, and a third position wherein the first spool is positioned close to the first end portion and away from the second spool and the second spool is positioned at the second end portion,
    said driving hydraulic pressure being introduced into said engaging hydraulic means to establish a lock-up condition of said torque converter when the shift valve means takes said first position,
    said driving hydraulic pressure being introduced into said disengaging hydraulic means to establish a converter condition of said torque converter when said shift valve means takes said second position, and
    said driving hydraulic pressure being introduced into both said engaging and disengaging hydraulic means to establish a slip condition of the torque converter when said shift valve means takes said third position.

2. A control system as recited in claim 1 wherein said shift valve means takes said first position when the first control means provides the first hydraulic pressure with a low value.

3. A control system as recited in claim 1 wherein said shift valve means takes said second position when the first control means provides the first hydraulic pressure with a high value.

4. A control system as recited in claim 1 wherein said shift valve means takes the third position when the second control means reduces said second hydraulic pressure and the first control means provides the first hydraulic pressure with a low value.

5. A control system as recited in claim 1 wherein said second spool is positioned in accordance with said second and third hydraulic pressures to define said driving hydraulic pressure for the disengaging hydraulic means.

6. A control system as recited in claim 1 wherein first control means comprises a solenoid valve subjected to an ON-OFF control.

7. A control system as recited in claim 1 wherein said second control means comprises a duty solenoid valve.

8. A control system as recited in claim 1 wherein third control means controls said control pressure in accordance with throttle valve opening so that the control pressure is increased as the throttle valve opening is increased.

9. A control system as recited in claim 1 wherein said adjusting valve means comprises a spool which is subjected to said second hydraulic pressure at one end and to said control pressure at the other end.

10. A control system as recited in claim 9 wherein said spool is positioned in accordance with said second hydraulic pressure and said control pressure to change the driving hydraulic pressure for the disengaging hydraulic means.

11. A control system as recited in claim 1 wherein said second hydraulic pressure is determined in accordance with a speed difference between an engine and a turbine of the torque converter.

* * * * *